(No Model.)

H. W. GREGORY.
DISCHARGING OIL FROM VESSELS UPON THE SURFACE OF THE SEA.

No. 303,999. Patented Aug. 26, 1884.

WITNESSES
W. A. Cambridge
R. J. Murray

INVENTOR
Henry W. Gregory
per P. E. Teschemacher
Atty

UNITED STATES PATENT OFFICE.

HENRY W. GREGORY, OF EAST WAREHAM, MASSACHUSETTS.

DISCHARGING OIL FROM VESSELS UPON THE SURFACE OF THE SEA.

SPECIFICATION forming part of Letters Patent No. 303,999, dated August 26, 1884.

Application filed March 3, 1884. (No model.)

*To all whom it may concern:*

Be it known that I, HENRY W. GREGORY, a citizen of the United States, residing at East Wareham, in the county of Plymouth and State of Massachusetts, have invented an Improved Apparatus for Discharging Oil upon the Surface of the Water from Vessels at Sea, to protect them from loss or injury in heavy weather, of which the following is a full, clear, and exact description, reference being had to the accompanying drawings, making part of the specification, in which—

Figure 1:
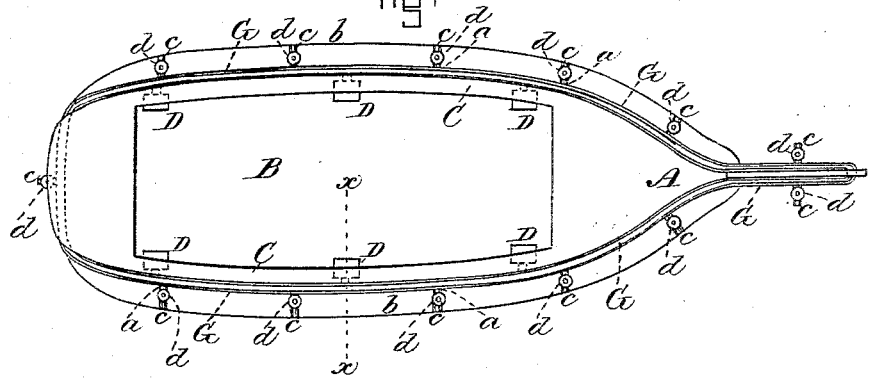
Figure 2:
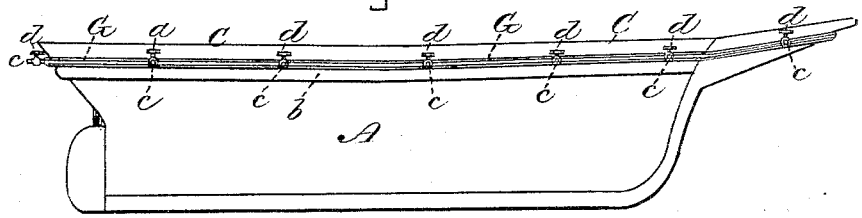
Figure 3:
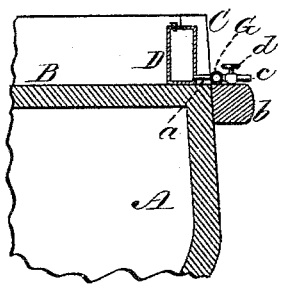

Figure 1 is a plan of a vessel having my improved oil-discharging apparatus applied thereto. Fig. 2 is a side elevation of the same. Fig. 3 is a transverse vertical section on the line $x\ x$ of Fig. 1, enlarged.

My invention has for its object to provide a vessel with a simple and convenient apparatus for automatically distributing oil upon the surface of the surrounding water to prevent heavy seas from breaking over her decks and thus protect her from total loss or injury in severe storms. In some cases a canvas bag punctured with small holes and containing oil has been hung over the side of a vessel, the oil dripping therefrom onto the water; but this method is a crude and inconvenient one and does not distribute the oil in as perfect and effective a manner as is desirable.

My invention consists in an automatic oil-distributing apparatus for vessels, composed of one or more oil-reservoirs communicating with a distributing-pipe extending wholly or partially around the vessel, and provided with a series of discharge or outlet pipes having suitable valves to regulate the flow or escape of the oil, which can by this means be uniformly distributed from various points at the same time in a much more effective manner than heretofore.

In the said drawings, A represents the hull of a vessel, and B the deck.

C represents the bulwarks, within or close to which, at suitable distances apart, are secured a series of reservoirs, D, for containing a supply of oil. These reservoirs D communicate through short pipes $a$ with a distributing-pipe, G, which extends entirely around the vessel, as seen in Fig. 1, and is preferably located immediately above the plank-sheer $b$, which thus serves as a fender and protects it from being crushed or injured by the contact of the side of the vessel with a pier or other object. If desired, the pipe G may extend only partially around the vessel; but I prefer to extend it wholly around the vessel, as shown, and instead of a series of oil-reservoirs, D, a single reservoir may be employed, if desired. The distributing-pipe G is provided at suitable intervals in its length with a series of discharge or outlet pipes, $c$, each of which is furnished with a valve or stop-cock, $d$, to regulate the flow or escape of the oil therefrom onto the surface of the water below, and by this means the oil can be evenly and uniformly distributed in the exact quantities desired from a great number of different points simultaneously; or, if desired, a portion only of the valves $d$ may be opened to cause the oil to be discharged from the bow, stern, or either side of the vessel, according to the requirements of the case. The distributing-pipe G is always intended to be entirely filled with oil, which insures a constant and proper discharge of the oil from all of the outlet-pipes, $c$, without regard to the pitching or rolling of the vessel.

The above-described apparatus is of simple construction; and is at all times ready for immediate use in severe storms or heavy weather, it being only necessary to open the valves $d$, when the flow of the oil will at once prevent the breakage of heavy seas over the deck and the disastrous results incident thereto, which oftentimes cause the loss of a vessel or great injury thereto, which might be avoided if convenient means for distributing oil were at hand.

I am aware it is not new to distribute oil upon the water to prevent the breaking of heavy seas over the deck of a vessel, and I do not claim this as my invention.

What I claim as my invention, and desire to secure by Letters Patent, is—

The oil-reservoirs D, arranged within the bulwarks C, in combination with the oil-distributing pipe G, communicating therewith and extending around the vessel, and the discharge or outlet pipes, $c$, with their regulating-valves $d$, all constructed and arranged to operate substantially in the manner and for the purpose described.

Witness my hand this 28th day of February, A. D. 1884.

HENRY W. GREGORY.

In presence of—
P. E. TESCHEMACHER,
W. J. CAMBRIDGE.